(12) United States Patent
Sekine

(10) Patent No.: US 11,443,736 B2
(45) Date of Patent: Sep. 13, 2022

(54) PRESENTATION SUPPORT SYSTEM FOR DISPLAYING KEYWORDS FOR A VOICE PRESENTATION

(71) Applicant: INTERACTIVE SOLUTIONS CORP., Tokyo (JP)

(72) Inventor: Kiyoshi Sekine, Tokyo (JP)

(73) Assignee: Interactive Solutions Corp., Tokyo (JP)

( * ) Notice: Subject to any disclaimer, the term of this patent is extended or adjusted under 35 U.S.C. 154(b) by 0 days.

(21) Appl. No.: 17/613,949

(22) PCT Filed: Sep. 9, 2020

(86) PCT No.: PCT/JP2020/034133
§ 371 (c)(1),
(2) Date: Nov. 24, 2021

(87) PCT Pub. No.: WO2021/140704
PCT Pub. Date: Jul. 15, 2021

(65) Prior Publication Data
US 2022/0148578 A1 May 12, 2022

(30) Foreign Application Priority Data
Jan. 6, 2020 (JP) .............................. JP2020-000566

(51) Int. Cl.
*G10L 15/22* (2006.01)
*G10L 15/08* (2006.01)
(Continued)

(52) U.S. Cl.
CPC .......... *G10L 15/083* (2013.01); *G10L 15/183* (2013.01); *G10L 15/1822* (2013.01);
(Continued)

(58) Field of Classification Search
CPC ................................ G10L 15/22; G10L 15/26
See application file for complete search history.

(56) References Cited

U.S. PATENT DOCUMENTS

| 6,192,343 B1 * | 2/2001 | Morgan ................. G10L 15/22 |
| | | 704/251 |
| 2007/0048715 A1 | 3/2007 | Miyamoto et al. |

(Continued)

FOREIGN PATENT DOCUMENTS

| CN | 109543173 A | 3/2019 |
| CN | 110473523 A | 11/2019 |

(Continued)

OTHER PUBLICATIONS

International Search Report of International Patent Application No. PCT/JP2020/034133 completed Oct. 12, 2020 and dated Oct. 27, 2020 (5 pages).

(Continued)

*Primary Examiner* — Jialong He
(74) *Attorney, Agent, or Firm* — Pyprus Pte Ltd; George D. Liu

(57) ABSTRACT

[Problem] Provided is a presentation support system that makes it possible to give effective presentations, for both presentations by machines and normal presenters.

[Solution] The presentation support system included: a display unit 3; a material storage unit 5 that stores a presentation material and a plurality of keywords; an audio storage unit 7; an audio analysis unit 9 that analyzes a term contained in a presentation; a keyword order adjustment unit 11 that analyzes an order of appearance of a plurality of keywords contained in the audio analyzed by the audio analysis unit and changes the order of the plurality of (Continued)

keywords on the basis of the order of appearance; and a display control unit 13 that controls content displayed in the display unit 3.

8 Claims, 5 Drawing Sheets

(51) Int. Cl.
    *G10L 15/18*      (2013.01)
    *G10L 15/183*    (2013.01)
    *G10L 15/26*      (2006.01)
    *G10L 15/28*      (2013.01)

(52) U.S. Cl.
    CPC .............. *G10L 15/26* (2013.01); *G10L 15/285* (2013.01); *G10L 2015/088* (2013.01)

(56) References Cited

U.S. PATENT DOCUMENTS

| | | | |
|---|---|---|---|
| 2007/0124681 A1 | 5/2007 | Abbar et al. | |
| 2008/0300872 A1* | 12/2008 | Basu | G06F 16/7844 704/235 |
| 2011/0314053 A1 | 12/2011 | Morikawa et al. | |
| 2014/0019133 A1* | 1/2014 | Bao | G10L 15/22 704/257 |
| 2015/0081277 A1 | 3/2015 | Behi | |
| 2015/0339045 A1* | 11/2015 | Sekine | G06F 3/04847 715/730 |
| 2017/0124054 A1* | 5/2017 | Campbell | G06F 3/04883 |
| 2020/0159801 A1* | 5/2020 | Sekine | G06F 16/9538 |

FOREIGN PATENT DOCUMENTS

| | | | | |
|---|---|---|---|---|
| JP | 2002-259635 A | 9/2002 | | |
| JP | 2004-288008 A | 10/2004 | | |
| JP | 2006-178087 A | 7/2006 | | |
| JP | 2007-256714 A | 10/2007 | | |
| JP | 2008-152605 A | 7/2008 | | |
| JP | 2008-254103 A | 10/2008 | | |
| JP | 2017-224052 A | 12/2017 | | |
| JP | 2019-124750 A | 7/2019 | | |
| WO | WO 2018/221120 | * | 12/2018 | G06F 17/30 |

OTHER PUBLICATIONS

Written Opinion of International Patent Application No. PCT/JP2020/034133 completed Oct. 12, 2020 and dated Oct. 27, 2020 (3 pages).
Office Action of Chinese application No. 202080038239.1 dated Mar. 18, 2022 (7 pages).
1 Written Opinion of Singapore application No. 11202111840Y dated Jun. 28, 2022 (7 pages).

* cited by examiner

[FIG. 1]
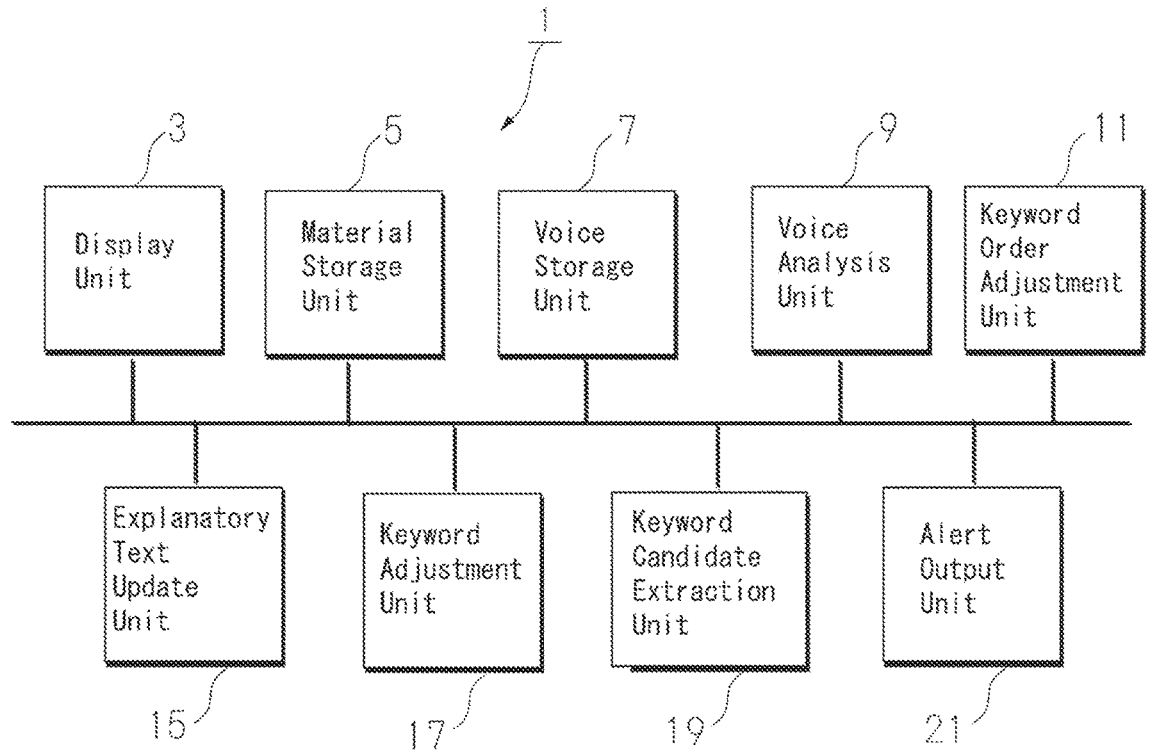
[FIG. 2]
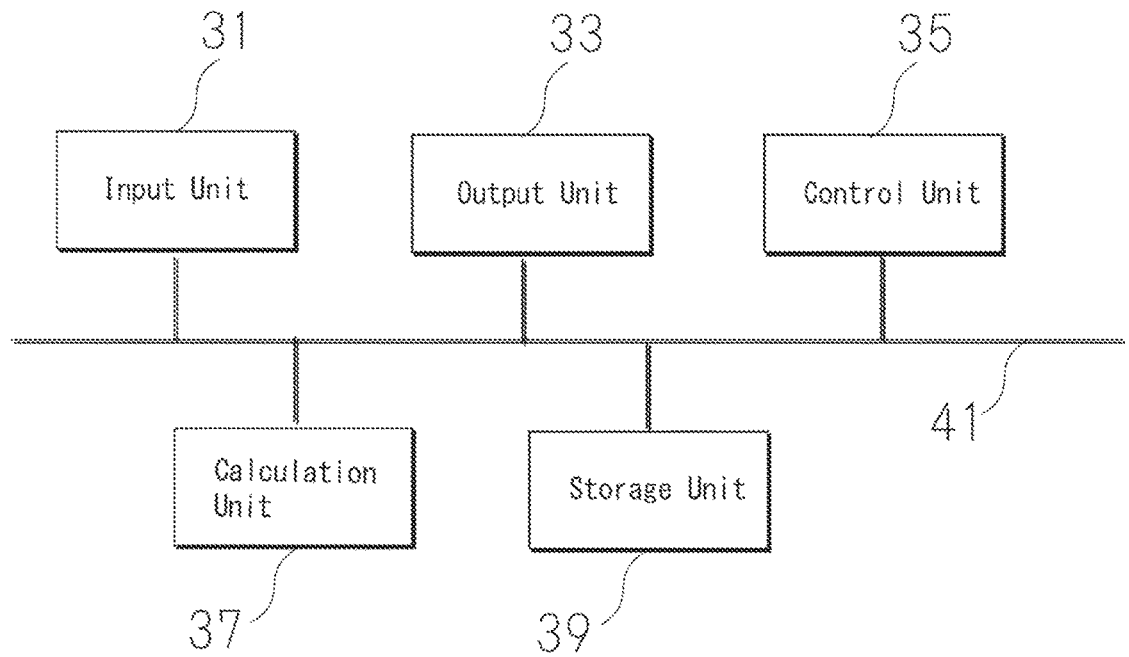

[FIG. 3]
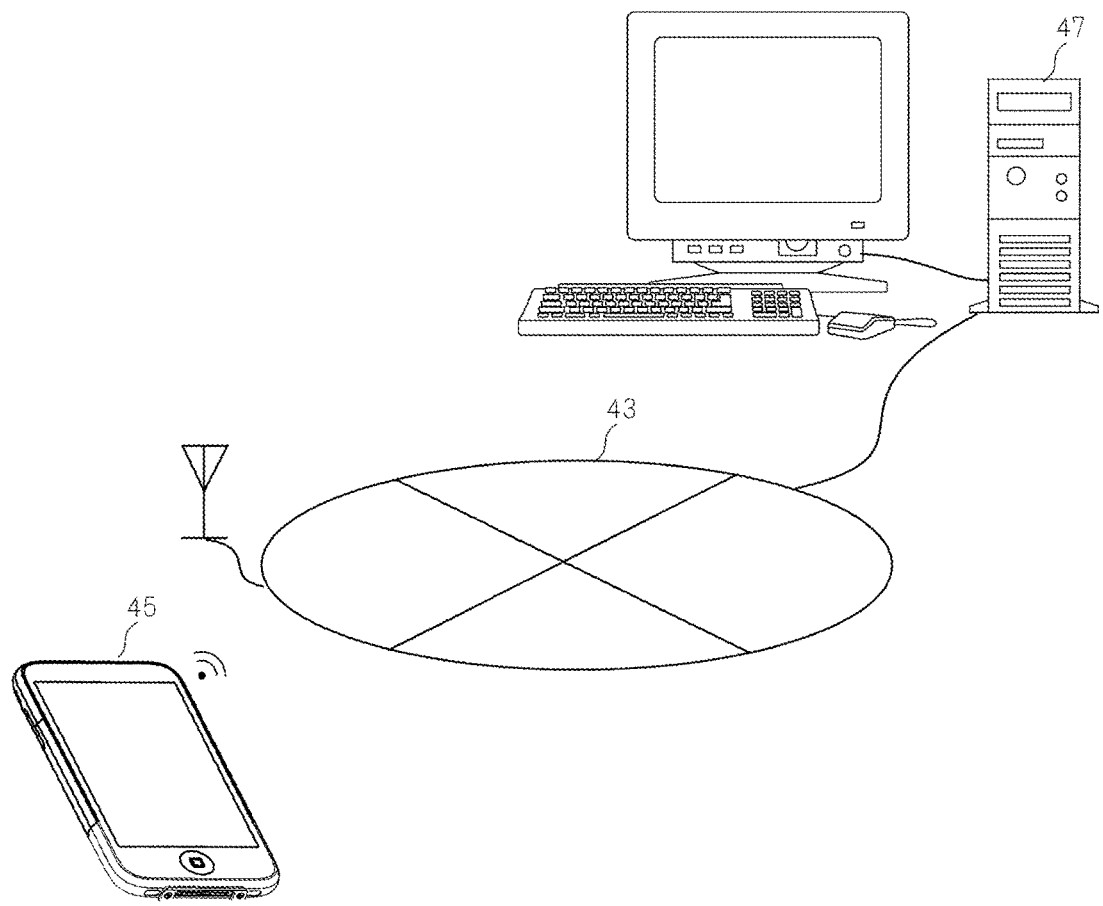

[FIG. 4]
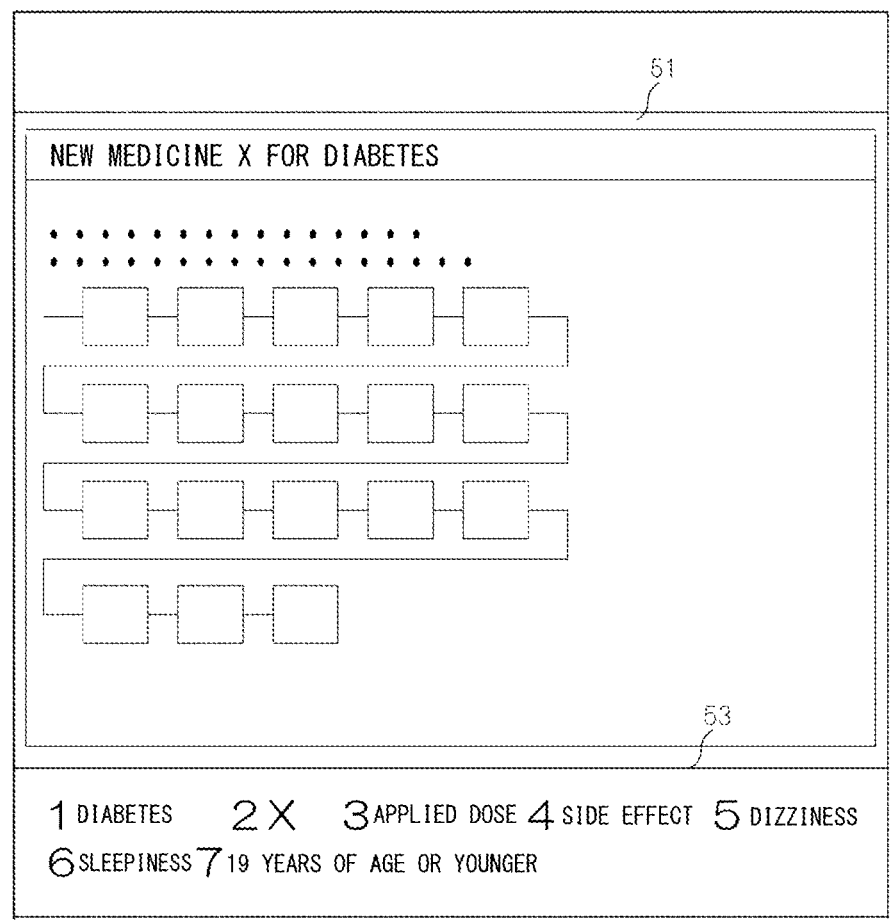

[FIG. 5]
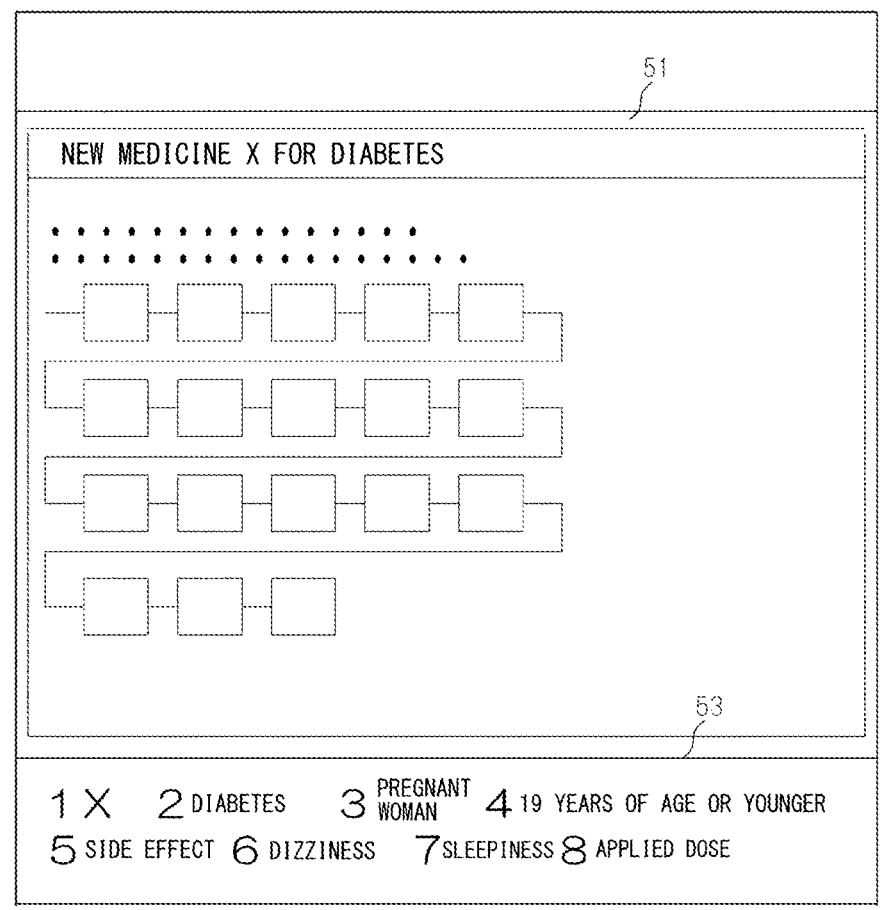

[FIG. 6]
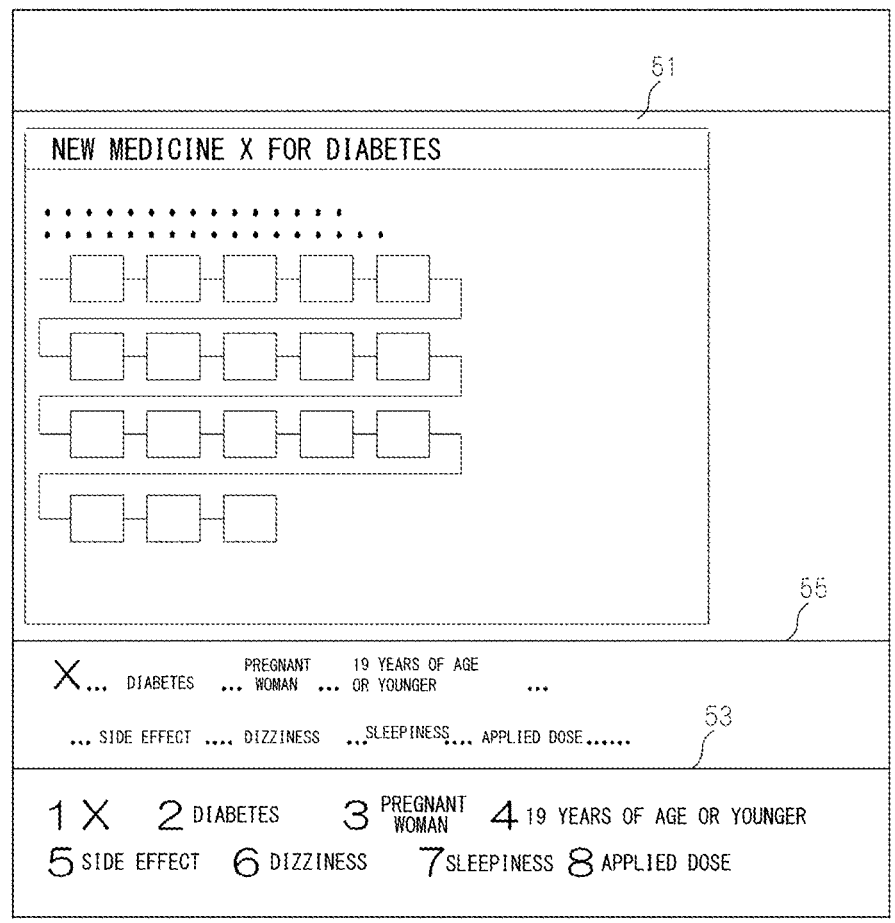

PRESENTATION SUPPORT SYSTEM FOR DISPLAYING KEYWORDS FOR A VOICE PRESENTATION

TECHNICAL FIELD

The present invention relates to presentation support systems. More specifically, this invention relates to computer-based presentation support systems capable of giving effective presentations, even when presentations are given mechanically or by ordinary presenters.

BACKGROUND ART

JP-A-2002-259635 discloses a system that displays keywords extracted from statements made in the process of discussion by participants in the form of combinations of graphic objects and texts.

JP-A-2017-224052 discloses a presentation evaluation device.

CITATION LIST

Patent Literature

PTL 1: JP-A-2002-259635
PTL 2: JP-A-2017-224052

SUMMARY OF THE INVENTION

Technical Problem

The present invention intends to provide a presentation support system capable of giving effective presentations even when presentations are mechanically given or by ordinary presenters.

Solution to Problem

The same presentation materials (e.g., PowerPoint (registered trademark)) were used in doing business by a plurality of medical representatives (MRs), cram school teachers, and sales persons. As a fact, in the case of excellent presenters such as excellent MRs, excellent cram school teachers, and excellent sales persons, there was a certain pattern in the appearance order of keywords in each page of respective presentation materials. On the other hand, in the case of poor presenters, it was difficult to find any pattern in the appearance order of keywords.

The above-described problem is basically based on the knowledge that it is possible to determine an optimum order in the usage of keywords, about a certain presentation material, through processes of recording sounds in a presentation by a presenter suitable for a certain situation, analyzing terms included in this presentation, and analyzing the appearance order of keywords included in the analyzed terms. The present invention is based on the knowledge that a predetermined level of quality can be ensured by clearly indicating the registration order of keywords in explanations by excellent presenters, even when the presentations are mechanically given, or even when the presentations are carried out by ordinary presenters.

An invention described in this specification relates to a presentation support system. This system is a system using a computer.

This system includes a display unit 3, a material storage unit 5, a voice storage unit 7, a voice analysis unit 9, a keyword order adjustment unit 11, and a display control unit 13. Respective units in this specification can be realized by respective means and elements in the computer. They may be realized as software or hardware, or may be realized in the form of cooperation of software and hardware.

The material storage unit 5 is an element for storing one or more presentation materials and a plurality of keywords relating to the one or more presentation materials.

The voice storage unit 7 is an element for storing presentations including voice information relating to the one or more presentation materials.

The voice analysis unit 9 is an element for analyzing terms included in the presentations stored in the voice storage unit 7.

The keyword order adjustment unit 11 is an element for analyzing an appearance order of a plurality of keywords included in voice analyzed by the voice analysis unit 9 and changing an order of the plurality of keywords based on the analyzed appearance order.

The display control unit 13 is an element for controlling contents displayed on the display unit 3. The display control unit 13 performs control for displaying the plurality of keywords on the display unit 3 based on the order of the plurality of keywords changed by the keyword order adjustment unit 11.

In a preferable example of this system, the material storage unit 5 further stores explanatory texts relating to the one or more presentation materials. The explanatory texts relating to the one or more presentation materials include a plurality of keywords. In addition, the system 1 further includes an explanatory text update unit 15 configured to update the explanatory texts based on the order of the plurality of keywords changed by the keyword order adjustment unit.

In a preferable example of this system, the material storage unit 5 further stores one or a plurality of relevant words relating to each keyword of the plurality of keywords. In addition, the system further includes a keyword adjustment unit 17. The keyword adjustment unit 17 is an element for adjusting the plurality of keywords stored in the material storage unit 5, for each of the plurality of keywords, based on the terms analyzed by the voice analysis unit such that when a relevant word of one keyword included in the plurality of keywords is determined to be used more frequently than the one keyword, the relevant word is regarded as a new keyword instead of the one keyword.

A preferable example of this system further includes a keyword candidate extraction unit 19. The keyword candidate extraction unit 19 is an element for analyzing a frequency of a term other than the plurality of keywords or the relevant words about the terms analyzed by the voice analysis unit 9 and extracting a term whose frequency is high as a new keyword or a new keyword candidate.

In a preferable example of this system, the material storage unit 5 further stores one or a plurality of relevant words relating to each keyword of the plurality of keywords. Further, when a relevant word of one keyword included in the plurality of keywords is used more frequently than the one keyword, this system (or the keyword candidate extraction unit 19 of this system) extracts the relevant word as a new keyword candidate, for each of the plurality of keywords, based on the terms analyzed by the voice analysis unit.

A preferable example of this system further includes an alert output unit 21 configured to output an alert when a term included in the presentation analyzed by the voice analysis unit 9 disagrees with the order of the plurality of keywords.

Another invention described in this specification relates to a computer program. This program is a program for causing a computer to function as the above-described presentation support system. Specifically, this program is a program that causes the computer to function as a presentation support system that includes display means, material storage means for storing the one or more presentation materials and a plurality of keywords relating to the one or more presentation materials, voice storage means for storing one or more presentations including voice information relating to the one or more presentation materials, voice analysis means for analyzing terms included in the one or more presentations stored in the voice storage means, keyword order adjustment means for analyzing an appearance order of a plurality of keywords included in voice analyzed by the voice analysis means and changing an order of the plurality of keywords based on the analyzed appearance order, and display control means for controlling contents displayed on the display means, wherein the display control means performs control for displaying the plurality of keywords on the display means based on the order of the plurality of keywords changed by the keyword order adjustment means. This program is, for example, for causing the computer to function as the above-described system.

Another invention described in this specification relates to a computer readable information recording medium storing the above-described program.

Advantageous Effects of Invention

The present invention can provide a presentation support system capable of giving effective presentations, even when presentations are given mechanically or by ordinary presenters.

BRIEF DESCRIPTION OF DRAWINGS

FIG. 1 is a block diagram illustrating an exemplary configuration of a presentation support system.

FIG. 2 is a block diagram illustrating a basic configuration of a computer.

FIG. 3 is a conceptual diagram illustrating an exemplary system of the present invention.

FIG. 4 is a conceptual diagram illustrating an exemplary display of the one or more presentation materials.

FIG. 5 is a conceptual diagram illustrating keywords according to the word order adjusted by a keyword order adjustment unit.

FIG. 6 is a conceptual diagram illustrating an exemplary display screen having an explanatory text display area.

DESCRIPTION OF EMBODIMENTS

Hereinafter, embodiments for carrying out the present invention will be described with reference to attached drawings. The present invention is not limited to the embodiments described below, and encompasses the ones appropriately modified from the following embodiments to the extent obvious to those skilled in the art.

An invention described in this specification relates to a presentation support system. This system is a system using a computer.

FIG. 1 is a block diagram illustrating an exemplary configuration of the presentation support system. As illustrated in FIG. 1, this system 1 includes the display unit 3, the material storage unit 5, the voice storage unit 7, the voice analysis unit 9, the keyword order adjustment unit 11, and the display control unit 13. As illustrated in FIG. 1, this system may further include the explanatory text update unit 15, the keyword adjustment unit 17, the keyword candidate extraction unit 19, and the alert output unit 21, and may appropriately include various elements provided in the computer.

Respective units in this specification can be realized by respective means and elements in the computer. They may be realized as software or hardware, or may be realized in the form of cooperation of software and hardware. This system may be implemented by a computer or may be implemented by a server-client system using a computer and a server. The computer may be a portable terminal, a desktop personal computer, a server, or a combination of two or more of them. These are usually connected in such a way as to enable reception/transmission of information via the Internet (intranet) or the like. Intending functional allotment, a plurality of computers may be used to assign a part of functions to a specific computer.

FIG. 2 is a block diagram illustrating a basic configuration of the computer. As illustrated in this drawing, the computer has an input unit 31, an output unit 33, a control unit 35, a calculation unit 37, and a storage unit 39. Respective units are connected via a bus 41 or the like so that reception/transmission of information can be performed. For example, the storage unit may store control programs and also may store various information. When predetermined information is input from the input unit, the control unit reads out a control program stored in the storage unit. Then, the control unit appropriately reads out information stored in the storage unit, and transmits the read information to the calculation unit. Further, the control unit appropriately transmits the input information to the calculation unit. The calculation unit performs arithmetic processing using the received various information, and stores calculation results in the storage unit. The control unit reads out calculation results stored in the storage unit, and causes the output unit to output the read calculation results. As mentioned above, various processing is executed. The one executing various processing is each means.

FIG. 3 is a conceptual diagram illustrating an exemplary system of the present invention. As illustrated in FIG. 3, the system of the present invention (a system including the device of the present invention) may include a portable terminal 45 connected to the Internet or intranet 43, and a server 47 connected to the Internet or intranet 43. It is needless to say that a single computer or portable terminal may function as the device of the present invention, or a plurality of servers may be present.

The display unit 3 is an element for displaying various information based on the computer. A monitor or display, which serves as the output unit 33 of the computer, or a touch panel of a smartphone, functions as the display unit 3. The display unit 3 may be a projector. When giving a presentation, the monitor of the computer or tablet functions as the display unit 3, meanwhile the one or more presentation materials may be screened by the projector. In this case, as will be described below, not only the one or more presentation materials but also either one or both of information on the word order of keywords and explanations may be displayed together on the monitor.

The material storage unit 5 is an element for storing the one or more presentation materials and the plurality of keywords relating to the one or more presentation materials. The storage unit of the computer functions as the material storage unit 5. Examples of the presentation materials include materials created with PowerPoint (registered trademark) or pdf (registered trademark). For example, the presentation material may be the whole (a file) of a series of materials created by software such as PowerPoint (registered trademark), or may be a specific page. For example, an identification number and ID are allocated to each of the presentation materials. The material storage unit 5 stores the plurality of keywords in relation to the allocated information (identification number and ID), or in relation to the identification number and the page number (slide number). In this manner, each presentation material or each page (each slide) of each material is stored in association with a plurality of keywords relating to each presentation material.

An example of the presentation material is a PowerPoint material relating to a new medicine X for diabetes. Examples of a plurality of keywords relating to this presentation material include "diabetes", "X", "applied dose", "side effect", "dizziness", "sleepiness", "pregnant woman" (as a subject that should not be administered), and "19 years of age or younger" (as a subject that should not be administered), which are keywords relating to this PowerPoint material. These words are stored in the material storage unit 5 in relation to, for example, the identification number (and each page number) of the presentation material.

FIG. 4 is a conceptual diagram illustrating an exemplary display of the presentation material. In this example, for example, displayed on the display unit 3 are a presentation area 51 where a page including a presentation material created with PowerPoint is displayed and a keyword display area 53 where keywords are displayed. For example, the display image of the presentation area 51 is displayed on the projector or an opponent monitor (an opponent display unit). Examples of the opponent display unit include opponent monitors, displays for a plurality of students, and a plurality of displays for audience.

The voice storage unit 7 is an element for storing one or more presentations including voice information relating to the one or more presentation materials. The storage unit of the computer functions as the voice recording unit 7. The presentation is based on the presentation material and includes voices and videos when a presenter gives explanations and the like. The presentation may contain voice information that has been converted into electric information via a sound collection device (computer input unit) such as a microphone and input to the computer. Further, the presentation may contain videos and voice information that have been converted into electric information via a recording device such as a video recorder and input to the computer. The voice information (and videos) having been thus input from the computer input unit can be stored in the storage unit serving as the voice storage unit 7.

The voice analysis unit 9 is an element for analyzing terms included in the one or more presentations stored in the voice storage unit 7. The voice analysis unit 9 is, for example, implemented by the control program stored in the storage unit. Voice recognition devices are well known. Therefore, a known voice recognition device can be appropriately used as the voice analysis unit. For example, it reads voice information from a presentation stored in the voice recording unit 7. Then, the control unit of the computer reads out the control program stored in the storage unit and causes the calculation unit to analyze the read voice information. In this case, it is sufficient that a plurality of terms stored in the storage unit and voice information of these terms are read out and terms included in the presentation are analyzed. Further, it is sufficient that the analyzed terms are stored appropriately in the storage unit. In this manner, the voice analysis unit 9 can analyze the terms included in the presentation that the voice storage unit 7 has stored.

For example, it suffices to analyze the terms included in the presentation together with information on a presenter and information on an attendee of the presentation, and store the analyzed terms in the storage unit. The presenter information may be stored in the storage unit. Examples of the presenter information include employee number, personal name, gender, age, operating results, job title, place of birth, evaluation on presentation, length of service, and years of responsibility. Examples of the information on the attendee of the presentation include the size of a hospital, location of the hospital, whether it is a lecture or oriented to a single doctor, and information on a doctor (if it is oriented to the doctor). Other examples of the information on the attendee of the presentation include the area of the lecture, level of participant, school year of participant, number of participants, occupation of participant, work contents of participant, length of service of participant, and job title of participant.

The keyword order adjustment unit 11 is an element for analyzing the appearance order of a plurality of keywords included in the voice analyzed by the voice analysis unit 9 and changing the order of the plurality of keywords based on the analyzed appearance order. The voice analysis unit 9 analyzes the terms included in the presentation and stores analyzed results in the storage unit. On the other hand, the material storage unit 5 stores the plurality of keywords. The keyword order adjustment unit reads out these and determines whether the read terms coincide with the plurality of keywords, and can obtain the appearance order of the plurality of keywords.

The keyword order adjustment unit 11 may include a machine learning program. It may be configured to automatically analyze term data stored in the storage unit according to an instruction of the machine learning program, so that the registration order of a plurality of keywords can be automatically adjusted. Such machine learning programs are well known.

For example, in a presentation by a certain presenter, if keywords of "X", "diabetes", "pregnant woman", "19 years of age or younger", "side effect", "dizziness", "sleepiness", and "applied dose" appear in this order, the appearance order of these keywords is stored in the storage unit together with information on this presenter. In such a case, for example, when a presentation is given by MRs and cram school teachers having good operating results in the Tokyo area, it is sufficient that the appearance order of keywords are collected and the word order is stored, and then the order of the keywords is adjusted and stored in the storage unit.

FIG. 5 is a conceptual diagram illustrating the keywords according to the word order adjusted by the keyword order adjustment unit. In this example, the transition of keyword is in the order of "X", "diabetes", "pregnant woman", "19 years of age or younger", "side effect", "dizziness", "sleepiness", and "applied dose", and further the keywords are tagged with Tokyo area/popular MR and stored collectively. Since such tags are attached, the keywords in the above-described word order can be read out, for example, using search information on popular MRs. Further, for example, the keywords in the above-described word order can be read out using search information on Tokyo area/popular MR.

The display control unit 13 is an element for controlling contents displayed on the display unit 3. The display control unit 13 performs control for displaying the plurality of keywords on the display unit 3 based on the order of the plurality of keywords changed by the keyword order adjustment unit 11. With this, the word order of the keywords can be customized. For example, in order to meet various purposes, the word order of the keywords can be customized using attributes of the presenter. The customization may be differentiated between excellent speakers and poor speakers. It may be oriented to large hospitals and small-sized hospitals, oriented to medical specialists and general physicians, or oriented to hospitals in Tokyo and hospitals in local areas. The display control unit 13 can perform display as illustrated in FIG. 5.

In a preferable example of this system, the material storage unit 5 further stores explanatory texts relating to the one or more presentation materials. The explanatory texts relating to the one or more presentation materials include a plurality of keywords. In addition, the system 1 further include the explanatory text update unit 15 configured to update the explanatory texts based on the order of the plurality of keywords changed by the keyword order adjustment unit.

FIG. 6 is a conceptual diagram illustrating an exemplary display screen having an explanatory text display area. As illustrated in FIG. 6, in this example, explanatory texts are created in the order of keywords displayed in a keyword display area 53 and displayed in an explanatory text display area 55. This explanatory text display area 55 may be displayed only on the display unit 3 for the presenter, or may also be displayed on an opponent display unit. It may be switched between being displayed and not being displayed on the opponent display unit. A computer on which a program for performing such processing is installed can easily perform the above control.

For example, in a case where a machine (robot) has a voice output unit, the voice output unit may be used for voice output of an explanatory text (a text included therein) stored in the material storage unit 5, so that the machine can give a presentation. Using the present invention in this manner enables the machine to give an optimum presentation.

In a preferable example of this system, the material storage unit 5 further stores one or a plurality of relevant words relating to each of respective keywords. The relevant words here include not only terms having the same meaning but also those expressing similar meaning by using the terms. The system further includes the keyword adjustment unit 17. The keyword adjustment unit 17 is an element for adjusting the plurality of keywords stored in the material storage unit 5, for each of the plurality of keywords, based on the terms analyzed by the voice analysis unit such that when a relevant word of one keyword included in the plurality of keywords is determined to be used more frequently than the one keyword, the relevant word is regarded as a new keyword instead of the one keyword. With respect to a keyword included in presentation explanatory notes and scripts, if there is any relevant word frequently used, the one keyword can be replaced by the relevant word. This makes it possible to flexibly cope with changes in the times. Further, this makes it possible to flexibly cope with dialects. A dictionary of relevant words for respective keywords may be prepared to change the keyword if one other than a first candidate of the keyword is used more frequently. In this case, the relevant word of one keyword may be regarded as a new keyword and the one keyword may be regarded as a relevant word of the new keyword, and then they may be stored in the material storage unit. A keyword relating to a certain presentation material and relevant words relating to the keyword may be updated in this manner.

If there is a "characteristic term even when its frequency is low", this term may be stored as a keyword in the material storage unit. In order to determine whether the term is characteristic, for example, a database dedicated to keyword candidates may be prepared, and if a term included in this database is included in the terms analyzed by the voice analysis unit, this term may be regarded as a new keyword. If there is an unknown keyword that is not yet registered in the keyword dictionary, the presence of this unknown keyword may be indicated. If there is an input from the input unit, this unknown keyword may be registered as a new keyword in the dictionary.

For example, suppose that "pregnancy" is used more frequently than "pregnant woman" when analyzing terms of a plurality of presentations having been recorded. In this case, the material storage unit 5 stores relevant words such as "pregnancy", "happy event", and "big belly" in relation to the keyword "pregnant woman", for example. The calculation unit reads out frequencies of those being subjected to the one or more presentations from the storage unit, and the calculation unit performs arithmetic processing. As a result, the computer can grasp that "pregnancy" was used more frequently than "pregnant woman". Accordingly, the keyword stored in the material storage unit 5 is updated from "pregnant woman" to "pregnancy", and correspondingly keywords displayed in the keyword display area 53 and the explanatory texts displayed in the explanatory text display area 55 may be automatically updated. In this case, for example, it is sufficient that "pregnant woman" being the original keyword is stored, as a relevant word of "pregnancy" being the new keyword relating to this presentation material, in the material storage unit.

A preferable example of this system further includes the keyword candidate extraction unit 19. The keyword candidate extraction unit 19 is an element for analyzing the frequency of a term other than the plurality of keywords or the relevant words about the terms analyzed by the voice analysis unit 9 and extracting a term whose frequency is high as a new keyword or a new keyword candidate. Accordingly, if there is any term that is frequently used other than a keyword or relevant words thereof in a case where keywords are displayed in a presentation, this term may be regarded as a new keyword or a new keyword candidate. The frequency may be, for example, the one higher than that of any of a plurality of keywords relating to a certain presentation material, or may be higher than that of any of all the keywords. Since such keywords are important terms to pursue effectiveness in the one or more presentations, the presentations can be carried out smoothly.

The keyword candidate extraction unit 19 may include a machine learning program. It may be configured to automatically analyze term data stored in the storage unit according to an instruction of the machine learning program, so that a term whose frequency is high can be automatically extracted as a new keyword candidate. Such machine learning programs are well known. It is sufficient that automatically extracted new keywords and keyword candidates are appropriately displayed on the display unit 3. Further, when keyword candidates are displayed on the display unit, if information on approval from an administrator or the like is input to the computer, it is sufficient that an approved keyword candidate is stored in the storage unit in response to this instruction, as one of keywords relating to the presentation material (or a certain page thereof).

In a preferable example of this system, the material storage unit 5 further stores one or a plurality of relevant words relating to each keyword of a plurality of keywords.

Then, when a relevant word of one keyword included in the plurality of keywords is used more frequently than the one keyword, this system (or the keyword candidate extraction unit 19 of this system) extracts this relevant word as a new keyword candidate, for each of the plurality of keywords, based on the terms analyzed by the voice analysis unit.

For example, when product A and product B are included in a presentation, "product C", which is a curative medicine of another company, for the same target disease that is a relevant word of the keywords "product A" and "product B", is stored as one of respective relevant words in the material storage unit 5. Further, when the terms "product A" and "product C" are included in this presentation, regarding a new candidate of the keyword relating to the presentation material, "product C" is extracted as a new keyword (or keyword candidate) from a plurality of relevant words stored in the material storage unit 5. Processing to be performed after extraction of the new keyword or new keyword candidate is the same as the processing described above.

A preferable example of this system further includes the alert output unit 21 configured to output an alert when a term included in the presentation analyzed by the voice analysis unit 9 disagrees with the order of the plurality of keywords.

In this example, the system reads out the presentation material from the storage unit and displays it on the display unit. The system reads out the order of keywords relating to this material (or page in this material) from the storage unit. Then, a presenter's presentation is input from the input unit such as a microphone. The voice analysis unit analyzes the input presentation for determining a term, and then, determines whether this term is any keyword (or relevant word) or is not a keyword (or relevant word). Then, when the analyzed term is one keyword (or its relevant word), it is determined whether this term agrees in keyword order. Then, if it agrees in keyword order, the processing is continued. On the other hand, if it does not agree in keyword order, an alert is output. An example of the alert is highlighting the correct keyword in the keyword display area 53.

Another invention described in this specification relates to a computer program and an information recording medium (e.g., CD-ROM) storing this program. This program is basically a program that can be read by the computer to enable the computer to function as any one of the above-described presentation support systems. For example, this program is a program for causing a computer to function as a presentation support system including display means, material storage means for storing presentation materials and a plurality of keywords relating to the one or more presentation materials, voice storage means for storing one or more presentations including voice information relating to the one or more presentation materials, voice analysis means for analyzing terms included in the one or more presentations stored by the voice storage means, keyword order adjustment means for analyzing the appearance order of a plurality of keywords included in the voice analyzed by the voice analysis means and changing the order of the plurality of keywords based on the analyzed appearance order, and display control means for controlling contents displayed on the display means, wherein the display control means performs control for displaying the plurality of keywords on the display means based on the order of the plurality of keywords changed by the keyword order adjustment means. Various means correspond to respective units of the above-described system.

In this program, the material storage means may further store explanatory texts relating to the one or more presentation materials. The explanatory texts relating to the one or more presentation materials include a plurality of keywords. The program may cause the computer to function so as to further include explanatory text update means for updating the explanatory texts based on the order of the plurality of keywords changed by the keyword order adjustment means.

In this program, the material storage means may further store one or a plurality of relevant words relating to each keyword of the plurality of keywords. The program may cause the computer to function so as to further include keyword adjustment means for adjusting the plurality of keywords stored in the material storage means, for each of the plurality of keywords, based on the terms analyzed by the voice analysis means such that when a relevant word of one keyword included in the plurality of keywords is determined to be used more frequently than the one keyword, the relevant word is regarded as a new keyword instead of the one keyword.

This program causes the computer to function so as to further include keyword candidate extraction means for analyzing the frequency of a term other than the plurality of keywords or the relevant words about the terms analyzed by the voice analysis means and extracts a term whose frequency is high as a new keyword candidate.

This program may cause the computer to function so as to further include alert output means for outputting an alert when a term included in the presentation analyzed by the voice analysis means disagrees with the order of the plurality of keywords.

INDUSTRIAL APPLICABILITY

The present invention relates to presentation support systems and therefore can be used in the information-related industry.

REFERENCE SIGNS LIST

1 Presentation support system
3 Display unit
5 Material storage unit
7 Voice storage unit
9 Voice analysis unit
11 Keyword order adjustment unit
13 Display control unit
15 Explanatory text update unit
17 Keyword adjustment unit
19 Keyword candidate extraction unit
21 Alert output unit

The invention claimed is:
1. A presentation support system comprising:
a display unit;
a material storage unit configured to store a presentation material and a plurality of keywords relating to the presentation material; wherein the material storage unit further stores explanatory texts relating to the presentation material, and the explanatory texts relating to the presentation material include the plurality of keywords;
a voice storage unit configured to store a presentation including voice information relating to the presentation material; and
a voice analysis unit configured to analyze terms included in the presentation stored in the voice storage unit, wherein
the system further comprises:
a keyword order adjustment unit configured to analyze an appearance order of the plurality of keywords included in voice analyzed by the voice analysis unit and change an order of the plurality of keywords based on the analyzed appearance order; and a display control unit configured to control contents displayed on the display unit, and the display control unit performs control for displaying the plurality of keywords on the display unit based on the order of the plurality of keywords changed by the keyword order adjustment unit;

wherein the system further includes an explanatory text update unit configured to update the explanatory texts based on the order of the plurality of keywords changed by the keyword order adjustment unit.

2. The system according to claim 1, wherein the material storage unit further stores one or a plurality of relevant words relating to each keyword of the plurality of keywords, and when a relevant word of one keyword included in the plurality of keywords is used more frequently than the one keyword, the system extracts the relevant word as a new keyword or a new keyword candidate, for each of the plurality of keywords, based on the terms analyzed by the voice analysis unit.

3. The system according to claim 1, wherein the system further includes an alert output unit configured to output an alert when a term included in the presentation analyzed by the voice analysis unit disagrees with the order of the plurality of keywords.

4. A presentation support system comprising:

a display unit;

a material storage unit configured to store a presentation material and a plurality of keywords relating to the presentation material;

a voice storage unit configured to store a presentation including voice information relating to the presentation material; and a voice analysis unit configured to analyze terms included in the presentation stored in the voice storage unit, wherein the system further comprises:

a keyword order adjustment unit configured to analyze an appearance order of the plurality of keywords included in voice analyzed by the voice analysis unit and change an order of the plurality of keywords based on the analyzed appearance order; and a display control unit configured to control contents displayed on the display unit, and the display control unit performs control for displaying the plurality of keywords on the display unit based on the order of the plurality of keywords changed by the keyword order adjustment unit;

wherein the material storage unit further stores one or a plurality of relevant words relating to each keyword of the plurality of keywords, and the system further includes a keyword adjustment unit configured to adjust the plurality of keywords stored in the material storage unit, for each of the plurality of keywords, based on the terms analyzed by the voice analysis unit such that when a relevant word of one keyword included in the plurality of keywords is determined to be used more frequently than the one keyword, the relevant word is regarded as a new keyword instead of the one keyword.

5. The system according to claim 3, wherein the system further includes a keyword candidate extraction unit configured to analyze a frequency of a term other than the plurality of keywords or the relevant words about the terms analyzed by the voice analysis unit and extract a term whose frequency is high as a new keyword or a new keyword candidate.

6. The system according to claim 3, wherein the material storage unit further stores one or a plurality of relevant words relating to each keyword of the plurality of keywords, and when a relevant word of one keyword included in the plurality of keywords is used more frequently than the one keyword, the system extracts the relevant word as a new keyword or a new keyword candidate, for each of the plurality of keywords, based on the terms analyzed by the voice analysis unit.

7. The system according to claim 3, wherein the system further includes an alert output unit configured to output an alert when a term included in the presentation analyzed by the voice analysis unit disagrees with the order of the plurality of keywords.

8. A non-transitory computer readable information recording medium storing a program, wherein when the program is executed, it performs:

storing in material storage means a presentation material and a plurality of keywords relating to the presentation materials;

stores in the material storage means explanatory texts relating to the presentation material, and the explanatory texts relating to the presentation material include the plurality of keywords;

storing in voice storage means a presentation including voice information relating to the presentation material;

analyzing by voice analysis means terms included in the presentation stored in the voice storage means;

analyzing by keyword order adjustment means an appearance order of the plurality of keywords included in voice analyzed by the voice analysis means and changing an order of the plurality of keywords based on the analyzed appearance order;

controlling by display control means contents displayed on display means;

displaying on the display means the plurality of keywords based on the order of the plurality of keywords changed by the keyword adjustment means; and updating by explanatory text update means the explanatory texts based on the order of the plurality of keywords changed by the keyword order adjustment means.

* * * * *